United States Patent
Ramey et al.

(10) Patent No.: US 6,564,050 B1
(45) Date of Patent: May 13, 2003

(54) METHOD AND APPARATUS FOR COMBINING CORDED AND CORDLESS TELEPHONES FOR TELEPHONE CONFERENCING AND INTERCOM

(75) Inventors: Blaine Edward Ramey, Indianapolis, IN (US); David Frederick Seefeldt, Lebanon, IN (US); Kumar Ramaswamy, Indianapolis, IN (US)

(73) Assignee: Thomas Licensing SA, Boulogne Cedex (FR)

( * ) Notice: Subject to any disclaimer, the term of this patent is extended or adjusted under 35 U.S.C. 154(b) by 0 days.

(21) Appl. No.: 09/438,464

(22) Filed: Nov. 12, 1999

Related U.S. Application Data

(60) Provisional application No. 60/145,690, filed on Jul. 26, 1999.

(51) Int. Cl.[7] .............................................. H04M 3/42
(52) U.S. Cl. ..................................... 455/416; 455/463
(58) Field of Search ................................. 455/554, 555, 455/550, 575, 74.1, 462, 463, 465, 422, 403, 533, 416, 417; 379/158, 159, 160, 165

(56) References Cited

U.S. PATENT DOCUMENTS

| | | | |
|---|---|---|---|
| 4,081,624 A | 3/1978 | Kerman et al. | |
| 4,805,172 A | 2/1989 | Barbe et al. | |
| 4,821,319 A | * 4/1989 | Middleton et al. | 379/167 |
| 5,073,923 A | 12/1991 | Offers et al. | |
| 5,151,896 A | 9/1992 | Bowman et al. | |
| 5,155,760 A | 10/1992 | Johnson et al. | |
| 5,465,256 A | 11/1995 | Fowler | |
| 5,471,523 A | 11/1995 | Smith et al. | |
| 5,537,465 A | 7/1996 | Bellafiore | |
| 5,719,870 A | 2/1998 | Baker et al. | |
| 5,787,115 A | 7/1998 | Turnbull et al. | |
| 5,862,136 A | 1/1999 | Irwin | |
| 5,887,054 A | * 3/1999 | Burke et al. | 379/159 |
| 5,909,432 A | * 6/1999 | Arends et al. | 370/261 |
| 6,044,268 A | * 3/2000 | Haartsen | 455/426 |
| 6,069,878 A | * 5/2000 | Christensen | 370/263 |
| 6,343,126 B1 | * 1/2002 | Stelman | 379/399.01 |

* cited by examiner

*Primary Examiner*—Charles N. Appiah
(74) *Attorney, Agent, or Firm*—Joseph S. Tripoli; Harvey D. Fried; Joseph J. Kolodka

(57) ABSTRACT

A method and apparatus for combining corded and cordless telephone handsets with either analog network lines or a digital network in order to perform intercom and conferencing functions. Specifically, the apparatus comprises a network interface coupled to each analog network line or a digital network line from a digital network, an analog converter coupled to each corded telephone handset, a digital converter coupled to each cordless telephone handset, a signal processing circuit coupled to the network interface as well as the analog converter and the digital converter, and a controller coupled to the signal processing circuit as well as the network interface or interface circuit, the analog converter and the digital converter. In operation, the signal processing circuit receives signals from the network interface, the analog converter and the digital converter in a time division multiplexed manner to generate output signals that are sent to the analog converter, the digital converter and network interface and reconverted to the respective corded telephone handsets, cordless telephone handsets, and analog/digital network lines.

18 Claims, 1 Drawing Sheet

METHOD AND APPARATUS FOR COMBINING CORDED AND CORDLESS TELEPHONES FOR TELEPHONE CONFERENCING AND INTERCOM

CROSS-REFERENCE TO RELATED APPLICATION

This invention claims benefit to U.S. Provisional Application Serial No. 60/145,690, filed Jul. 26, 1999, and incorporated herein by reference in its entirety.

FIELD OF THE INVENTION

The invention generally relates to data communication systems. More particularly, the invention involves a method and an apparatus for supporting intercom and conferencing between corded and cordless telephone handsets.

BACKGROUND OF THE DISCLOSURE

Private Branch Exchange (PBX) devices are used to expand the number of telephone handsets or sets which share a common Plain Old Telephone System (POTS) line or a set of POTS lines from a business or residence to a telephone company Central Office (CO) switch. PBX devices support features such as set-to-set intercom and set-to-CO conferencing.

Conventional analog techniques for generating local signals for intercom or summed signals for intercom require analog multiplexers and summing amplifiers. In contrast, digital techniques usually require high speed Digital Signal Processors (DSP). As such, there is difficulty in combining analog and digital techniques for generating intercom and conferencing signals.

Therefore, in a multi-handset hybrid telephone system supporting both analog and digital cordless telephone applications, the task of supporting intercom and conferencing features between corded and cordless telephones is problematic. A need exists in the art to support intercom and conferencing features between analog corded telephones and digital cordless telephones.

SUMMARY OF THE INVENTION

The invention overcomes the disadvantages of the prior art by providing a method and apparatus for combining corded and cordless telephone handsets in intercom and conferencing applications.

A first embodiment of the invention is a device that combines corded and cordless telephone handsets to analog network lines. Specifically, the device comprises a codec coupled to each analog network line, an analog to digital converter coupled to each corded telehone handset, a digital converter coupled to each cordless telephone handset, a signal processing circuit coupled to the codec, the analog to digital converter and the digital converter, and a controller coupled to the signal processing circuit, the codec, the analog to digital converter and the digital converter.

The codec digitizes a signal from the analog input line, the analog to digital converter digitizes a signal from the corded telephone handset and the digital converter demodulates and possibly decompresses a signal from the digital cordless telephone handset. These signals may comprise audio signals. The signal processing circuit receives the signals from the codec, analog to digital converter and digital converter during time division multiplexed (TDM) slots as determined by the controller. The number of time solts required is equal to the sum of corded telephone handsets, cordless telephone handsets and analog network lines.

The signal processing circuit then generates a set of output signals from the received signals. In operation, the signal processing circuit receives a signal during each time slot, multiplies the signal by a set of programmed coefficients to generate one output signal for each corded telephone handset, cordless telephone handset and analog network line. The circuit adds the products for each time frame to values from the previous time slot to provide a running total. As such, the signal processing circuit is generally a multiply and accumulate circuit.

The codec, analog to digital converter and digital converter then processes the output signals to the respective analog network lines, corded telephone handsets and cordless telephone handsets and cordless telephone handsets. These components operate in a reverse fashion to that previously described.

A second embodiment of the invention is a device that combines corded and cordless telephone handsets to a digital network. In this embodiment, the device comprises a digital interface coupled to the digital network, an analog to digital converter coupled to each corded telephone handset, a digital converter coupled to each cordless handset, signal processing circuit coupled to the digital interface as well as the analog to digital converter and the digital converter, and a digital signal processor coupled to the signal processing circuit as well as the digital interface.

The first and second embodiments are similar with the exception of this second embodiment comprising a digital interface instead of a codec, and a digital signal processor instead of a controller. The digital interface may comprise a cable modem or digital subscriber line (DSL) modem for decoding a signal from the digital network and a decompressor/compressor for decompressing a compressed audio signal from the network or compressing an audio signal to the network. The digital signal processor may packetize the signals from the digital interface, the analog converter and the digital converter in substantially the same manner as the controller in the first embodiment.

BRIEF DESCRIPTION OF THE DRAWINGS

The teachings of the present invention can be readily understood by considering the following detailed description in conjunction with the accompanying drawings, in which.

To facilitate understanding of the invention, identical reference numerals have been used, where possible, to designate identical elements that are common to the figures.

DETAILED DESCRIPTION

Figure 1:
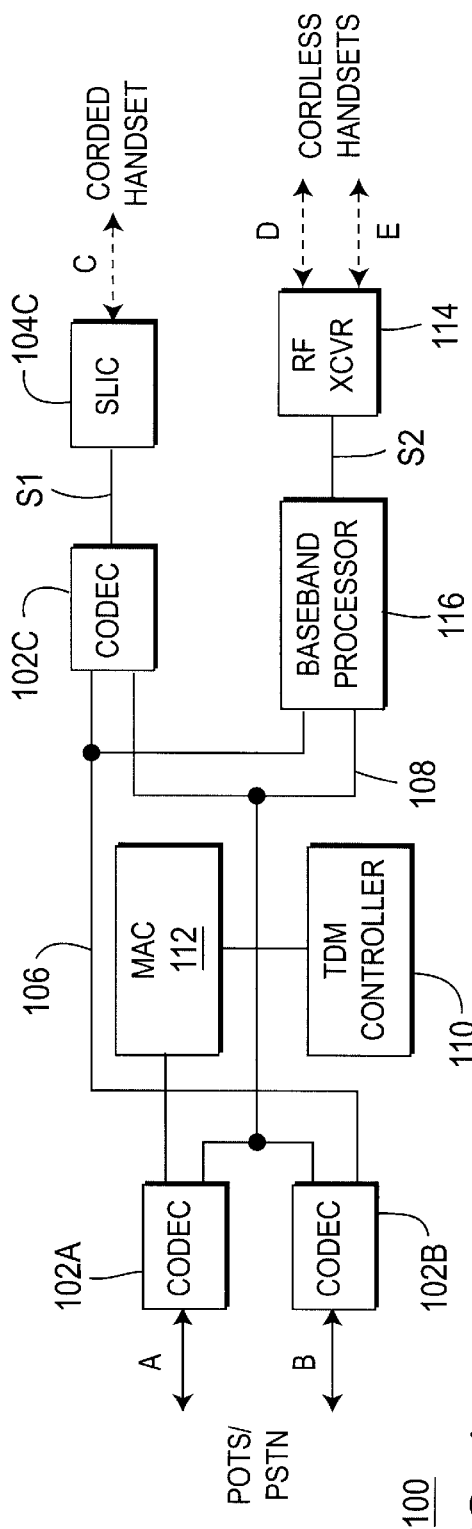
FIG. 1 shows a high level block diagram of a telephone system that integrates corded and cordless telephone handsets with POTS network lines.

FIG. 1 shows a high level block diagram of a telephone system 100 that integrates corded and cordless telephone handsets with POTS lines. As with a conventional Private Branch Exchange (PBX) system, the telephone system 100 coordinates telephone handsets to POTS lines that are connected to a telephone company central office (CO) switch. However, the telephone system 100 in accordance with the present invention supports intercom between corded and cordless telephone handsets, and conferencing between corded telephone handsets, cordless telephone handsets and telephone lines that link other telephone handsets.

Specifically, the telephone system 100 includes a coder-decoder or codec 102A, 102B and 102C for each telephone line and for each corded telephone handset, a Subscriber Line Interface Circuit (SLIC) 104C for each corded telephone handset, a Time-Division-Multiplexed (TDM) bus 106, a control port 108, a TDM controller 110, a Multiply and Accumulate Circuit (MAC) 112, a radio-frequency (RF) transmitter-receiver or transceiver (XCVR) 114 for the cordless telephone handsets and a baseband processor 116 for the cordless telephone handsets.

In operation, each of the codecs 102A or 102B samples data, typically an audio signal, entering the telephone system 100 from the respective analog POTS network lines via respective signal lines A and B and encodes the sampled data to digitize the analog data signal. On a system level, the codecs 102A and 102B operate as a network interface, coupled to the analog network lines via signal lines A and B, for converting or digitizing the incoming signals into digital network signals. As such, the codecs 102A and 102B operate as analog to digital converters for data entering the telephone system 100 and as digital to analog converters for data leaving the telephone system 100.

The codecs 102A and 102B couple the MAC 112 via the TDM bus 106 and couple the TDM controller 110 via the control port 108. After digitizing the analog signals from the POTS lines, each of the codecs 102A or 102B writes or drives the respective digitized signals to the TDM bus 106 during a time slot as determined by the TDM controller 110. Each of the codecs 102A or 102B reads output data from the TDM bus 106 during the time slot set by the TDM controller 110.

In addition to processing signals from the analog POTS network lines, the telephone system 100 processes signals from the corded and cordless telephone handsets. The SLIC module 104C processes signals from the corded telephone handset via signal line C. The SLIC module 104C couples the codec 102C via signal path S1.

The codec 102C for the corded telephone handset operates in substantially the same manner as codecs 102A and 102B for the POTS lines. The codec 102C samples and encodes the signal from path S1 to produce a digitized signal for the corded telephone handset. Each paired SLIC module 104C and codec 102C, as coupled to the corded telephone handset via signal path C, operates as an analog converter for digitizing the signal from the cordless handset into a digital corded handset signal.

The codec 102C couples the MAC 112 via the TDM bus 106 and couples the TDM controller 110 via the control port 108. As such, the codec 102C writes to or reads from the TDM bus 106 during time frames as determined by the TDM controller 110.

The RF XCVR or radio frequency transceiver 114 demodulates the radio frequency signals, from the cordless telephone handsets via signal paths D and E, into baseband signals. The RF XCVR 114 couples the baseband processor 116 via signal path S2. The baseband processor 116 decodes the baseband signal into a digital cordless handset signal of a particular cordless telephone handset. As such, the RF XCVR 114 and baseband processor 116 is a digital converter, coupled to the cordless handsets via signal paths D and E, for converting the signal from the cordless handsets into a digital cordless handset signal. This signal is provided to the TDM bus 106 during a time slot determined by the TDM controller 110.

The baseband processor 116 may support multiple cordless telephone handsets illustratively shown via lines D and E. As the telephone system 100 digitizes audio signals from both corded and cordless telephone handsets in the same digitized format on the TDM bus 106, the TDM controller 110 and the MAC 112 views the baseband processor 116 as multiple codecs, each with an unique time slot. The required number of time slots for the TDM bus 106 equals the total number of telephone handset and external lines. As such, five time slots are required in the example shown in FIG. 1.

As the codecs 102A, 102B and 102C and the baseband processor 116 couple the TDM controller 110 via the TDM bus 106, the TDM controller 110 sends control signals for enabling the codecs 102A, 102B and 102C, and the baseband processor 116 to write or read from the TDM bus 106 during scheduled time slots. The TDM controller 110 couples the MAC 112 via the control port 108. The TDM controller. 110 also sets up a desired matrix in the MAC 112 at the beginning of the call and cancels this matrix at the end of the call.

The MAC or multiply and accumulate circuit or signal processing circuit 112 generally reads data from different time slots, forms balanced summed signals from the input data and writes output signals onto the TDM bus 106 during a time slot determined by the TDM controller 110. More specifically, the MAC 112 reads the input values during the appropriate time slots in a TDM frame, multiplies each input value by its coefficient, accumulates the products and writes the resulting sum to the TDM bus 106 during the appropriate time slot in the next frame. Each of these specific steps will be discussed in greater detail below.

The MAC 112 initially reads the input data values from the TDM bus 106 during appropriate time slots in a TDM frame. These input values arrive as each codec 102A, 102B, or 102C, or the baseband processor 116 writes to the TDM bus 106 during its scheduled time slot as controlled by the TDM controller 110. The TDM bus 106, which couples the MAC 112 with the codecs 102A, 102B and 102C, and the baseband processor 116, includes two data lines which serve as input and output data lines to the MAC 112. As the input values arrive through the input data line, the MAC 112 simultaneously writes data to the codec 102A, 102B or 102C, or the baseband processor 116 through the output line of the TDM bus 106. The number of required time slots is usually equal to the number of corded and cordless telephone handsets plus the number of POTS lines. In this small system example shown in FIG. 1, the MAC 112 requires five time slots.

The MAC 112 multiplies each input value by its coefficient and accumulates the products after each succeeding time slot. The coefficients, typically expressed in matrix format for a plurality of telephone lines and telephone handsets, are provided as the TDM controller 110 sets up the desired coefficient matrix at the beginning of the telephone conference or intercom. The coefficient matrix values depend on the corded and cordless handsets that are connected during the conference. These coefficient matrix values may change when other corded and cordless handsets join and/or exit the conference or intercom. As the MAC 112 interacts with the TDM controller 110 only during matrix setup and cancellation, the configuration may significantly reduce digital. signaling requirements for the telephone system 100. The MAC 112 may comprise a special-purpose sequential circuit to perform the multiply and accumulate functions and to ensure quick operation of the telephone system 100.

As an illustrative example, the telephone system 100 may involve a conferencing application such that POTS lines A and B are linked with telephone handset C. Let Ai represent input to the system from line A, $A_o$ represent output to line A, and $k_a$ represent the multiplying coefficient. Input, output and multiplying coefficients are similarly represented for POTS line B and telephone handset C as $B_i$, $B_o$, $k_b$, $C_i$, $C_o$ and $k_c$. The MAC determines the resulting sums:

$$Ao=k_bBi+k_cCi \quad Bo=k_aAi+k_cCi \quad Co=k_aAi+k_bBi$$

using the multiply and accumulate procedure discussed above.

After reading the input data, multiplying the inputs by its coefficient and accumulating the products, the MAC 112 writes the resulting output to the output lines of the TDM bus 106 as determined by the TDM controller 110. This output is usually delayed one frame time from the input as a particular input signal component may have arrived later in the previous frame. The delay is not perceptible as the frame time is normally about 125 μsec. However, the MAC 112 may also include echo cancellation digital filters to introduce a greater process delay.

The codecs 102A, 102B and 102C, and the baseband processor 116 read the output values of the MAC 112 from the TDM bus 106 as determined by the TDM controller 110. The codecs 102A, 102B and 102C then convert these outputs into analog signals for the respective POTS lines and corded telephone handsets.

Figure 2:
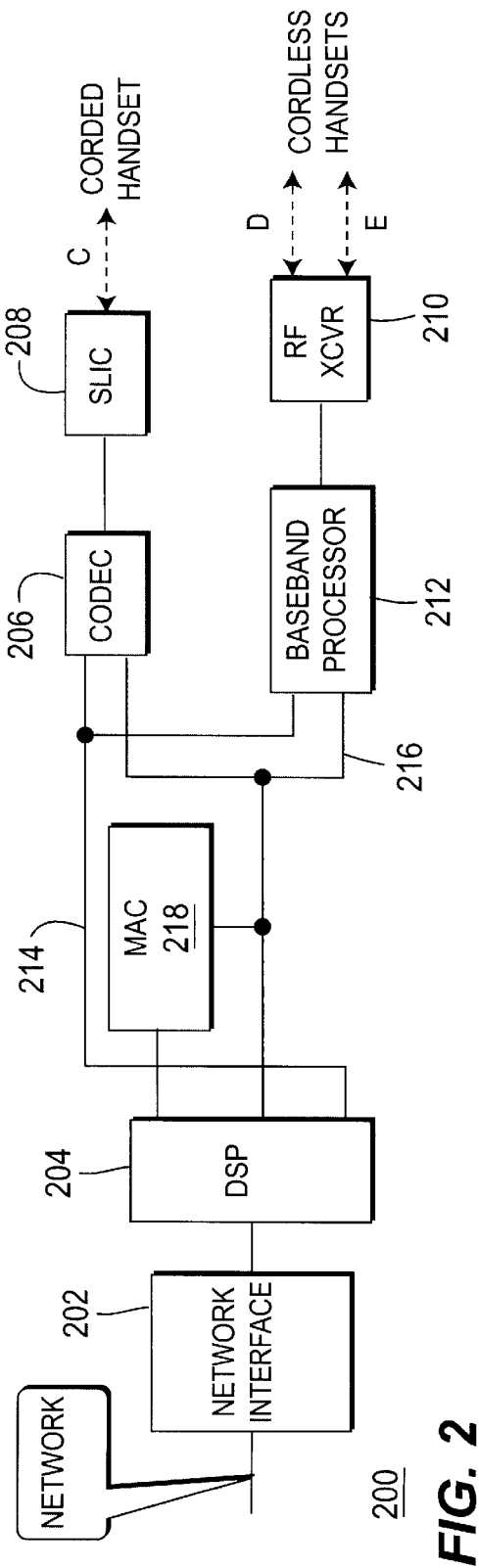
FIG. 2 shows a high level block diagram of a telephone system that integrates corded and cordless telephone handsets with a digital telephone system.

FIG. 2 shows a high level block diagram of a telephone system 200 that integrates corded and cordless telephone handsets with a digital telephone system. The telephone system 200 is similar to the telephone system 100 shown in FIG. 1 except for the signal processing used for coupling signals from and to the digital telephone system or digital network.

The codec 206, SLIC 208, RF XCVR 210, baseband processor 212, TDM bus 214, control port 216 and MAC 218 operate in substantially the same manner as the respective codec 102C, SLIC 104C, RF XCVR 114, baseband processor 116, TDM bus 106, control port 108 and MAC 112 of the previous telephone system 100. As such, no further discussion is provided for these components.

Specifically, the telephone system 200 includes a network interface 202, a digital signal processor (DSP) module 204, a codec 206 for each corded telephone handset, a SLIC 208 for each corded telephone handset, a RF receiver 210 for the cordless telephone handsets, a baseband processor 212 for the cordless telephone handsets, a TDM bus 214, a control port 216 and a MAC 218.

The network interface 202 processes digital speech from the digital network. The network interface 202, which typically comprises physical layer and medium access layer components, may include a digital cable modem or a digital subscriber line (DSL) modem for decoding the speech from the digital network. The network interface 202 may also include a compressor/decompressor module for decompressing incoming compressed speech or compressing speech to the digital network in order to better utilize bandwidth. The network interface 202 couples the DSP module 204 via a signal path S3.

The DSP module 204 provides the control functions of the telephone system 200 in a similar manner to the TDM controller in the previous telephone system 100. Additionally, the DSP module 204 may provide speech compression, silence suppression and packetization. A lower-powered DSP module 204 is possible as the MAC 218 may perform sum and multiply functions for the DSP 204.

Although various embodiments which incorporate the teachings of the present invention have been shown and described in detail herein, those skilled in the art can readily devise many other varied embodiments that still incorporate these teachings.

What is claimed is:

1. Apparatus for supporting intercom and conferencing between corded telephone handsets, cordless telephone handsets and a network line, the apparatus comprising:

a network interface coupled to each network line, for converting a signal from the network line into a digital network signal;

an analog to digital converter, coupled to each corded telephone handset, for digitizing a signal from the corded telephone handset into a digital corded handset signal;

a digital converter, coupled to the cordless telephone handsets, for converting a signal from the cordless telephone handsets into a digital cordless handset signal; and an a signal processing circuit, coupled to said network interface, said analog to digital converter and said digital converter, for generating a set of output signals from the digital network signal, the digital corded handset signal and the digital cordless handset signal; and a means for scheduling data transfer between said signal processing circuit and said network interface, and analog to digital converter and said digital converter.

2. The apparatus of claim 1, wherein:

the network line is an analog network line;

said network interface is a codec for digitizing the signal from the analog network line; and said scheduling means is a time division multiplexed controller coupled to said signal processing circuit, said network interface, said analog to digital converter and said digital converter.

3. The apparatus of claim 1, wherein:

the network line is a digital network line from a digital network; and said scheduling means is a digital signal processing circuit coupled to said signal processing circuit, said network interface, said analog to digital converter and said digital converter.

4. The apparatus of claim 3 wherein said network interface comprises:

a cable modem, coupled to the digital network line, for demodulating the signal from the digital network; and a decompressor/compressor, coupled to said cable modem and said digital signal processing circuit, for decompressing the signal from said cable modem.

5. The apparatus of claim 3 wherein said network interface comprises:

a digital subscriber line modem, coupled to the digital network line, for demodulating the signal from the digital network; and a decompressor/compressor, coupled to said digital subscriber line modem and said digital signal processing circuit, for decompressing the signal from said digital subscriber line modem.

6. The apparatus of claim 1 wherein said analog to digital converter comprises:

an subscriber interface circuit, coupled to the corded telephone handset, for receiving the signal from the corded telephone handset; and a codec, coupled to said subscriber interface circuit and said signal processing circuit, for digitizing the signal from said subscriber interface circuit.

7. The apparatus of claim 1 wherein said digital converter comprises:
a transceiver, coupled to the cordless telephone handsets, for demodulating a radio-frequency signal from the cordless telephone handset into a baseband signal; and
a baseband processor, coupled to said transceiver and said signal processing circuit, for decoding the baseband signal from said transceiver.

8. The apparatus of claim 1 further comprising a data bus for coupling said network interface, said analog converter and said digital converter to said signal processing circuit.

9. The apparatus of claim 8 wherein said data bus is a time division multiplexed bus.

10. The apparatus of claim 1, further comprising a control port for coupling said network interface, said analog converter, said digital converter and said signal processing circuit to said controller.

11. The apparatus of claim 1 wherein said signal processing circuit is a multiply and accumulate circuit.

12. A method for performing telephone conferencing and intercom for corded and cordless telephone handsets, comprising the steps of:
producing first, second and third signals respectively from a telecommunications network, a cordless telephone handset and a corded telephone handset;
combining first and second signals to form a first composite signal;
combining said first and third signals to form a second composite signal;
combining said second and third signals to form a third composite signal;
coupling said first composite signal to said corded telephone handset;
coupling said second composite signal to said cordless handset; and
coupling said third composite signal to said telecommunications network.

13. The method of claim 12 wherein each of said combining steps further comprise the steps of:
digitizing said first, second and third signals; and
forming digital first second and third composite signals.

14. The method of claim 13 wherein each of said coupling steps further comprise the step of routing said digital first second and third composite signals using time division multiplexing.

15. The method of claim 14 wherein said combining steps are performed using a multiply and accumulate circuit.

16. The method of claim 12 wherein:
said first signal is produced as a digital signal; and
said combining steps further comprises the steps of:
digitizing said second and third signals; and
forming digital first second and third composite signals.

17. The method of claim 16 wherein each of said coupling steps further comprise the step of routing said digital first second and third composite signals using time division multiplexing.

18. The method of claim 17 wherein said combining steps are performed using a multiply and accumulate circuit.

* * * * *